Sept. 19, 1933.    E. F. ZAPARKA    1,927,538
SUSTAINING AND CONTROL SURFACE
Filed March 1, 1930    10 Sheets-Sheet 1

INVENTOR.
Edward F. Zaparka
BY Duell, Dunn & Anderson
ATTORNEYS.

Sept. 19, 1933.   E. F. ZAPARKA   1,927,538
SUSTAINING AND CONTROL SURFACE
Filed March 1, 1930   10 Sheets-Sheet 3

INVENTOR.
Edward F. Zaparka
BY Duell, Dunn & Anderson
ATTORNEYS.

Sept. 19, 1933.　　　　E. F. ZAPARKA　　　　1,927,538
SUSTAINING AND CONTROL SURFACE
Filed March 1, 1930　　10 Sheets-Sheet 4

INVENTOR.
Edward F. Zaparka
BY Duell, Dunn & Anderson
ATTORNEYS.

Sept. 19, 1933.  E. F. ZAPARKA  1,927,538
SUSTAINING AND CONTROL SURFACE
Filed March 1, 1930  10 Sheets-Sheet 5

INVENTOR.
Edward F. Zaparka
BY Duell, Dunn & Anderson
ATTORNEYS.

Sept. 19, 1933.  E. F. ZAPARKA  1,927,538
SUSTAINING AND CONTROL SURFACE
Filed March 1, 1930  10 Sheets-Sheet 6

INVENTOR.
Edward F. Zaparka
BY Duell, Dunn & Anderson
ATTORNEYS.

Sept. 19, 1933.   E. F. ZAPARKA   1,927,538
SUSTAINING AND CONTROL SURFACE
Filed March 1, 1930   10 Sheets-Sheet 7

INVENTOR.
Edward F. Zaparka
BY Duell, Dunn & Anderson
ATTORNEYS.

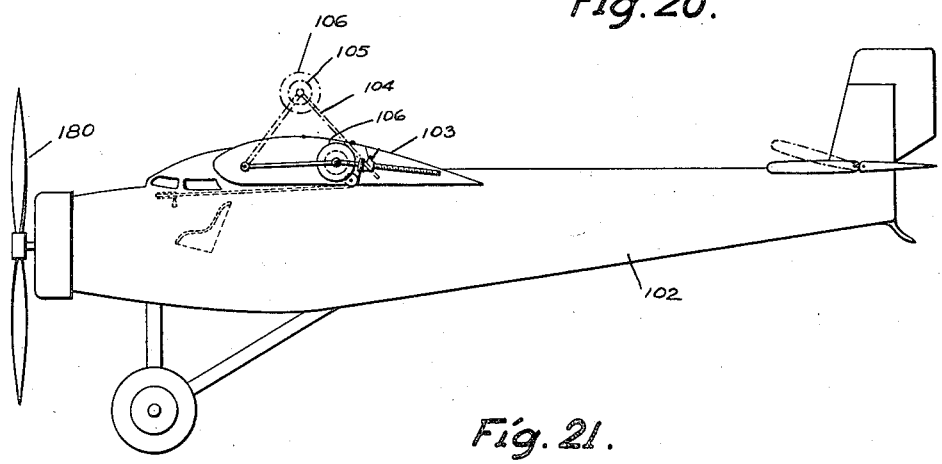
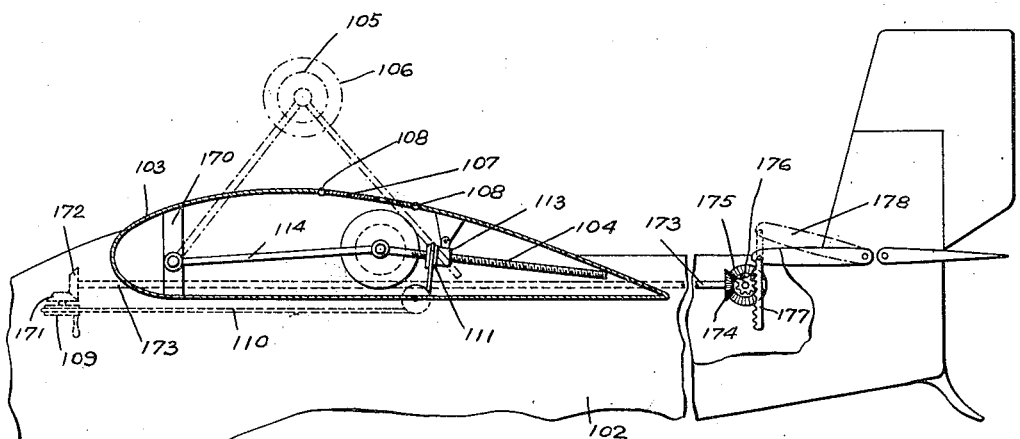
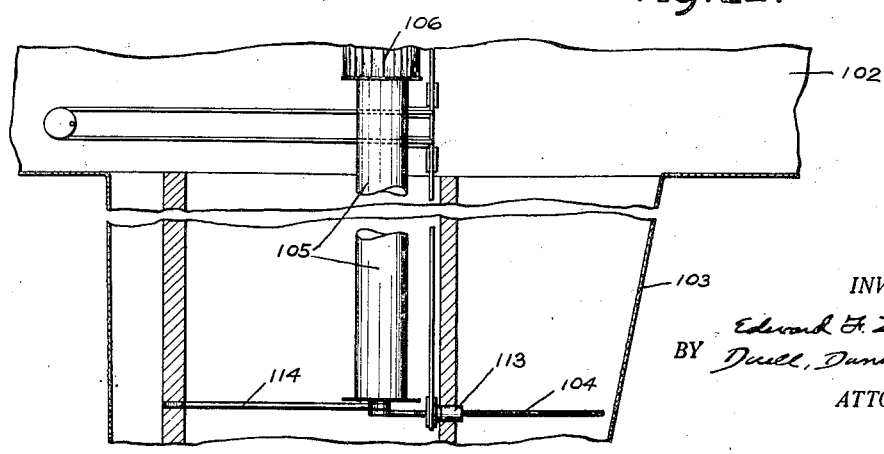

Sept. 19, 1933.   E. F. ZAPARKA   1,927,538
SUSTAINING AND CONTROL SURFACE
Filed March 1, 1930    10 Sheets-Sheet 9

INVENTOR.
Edward F. Zaparka
BY Duell, Dunn & Anderson
ATTORNEYS.

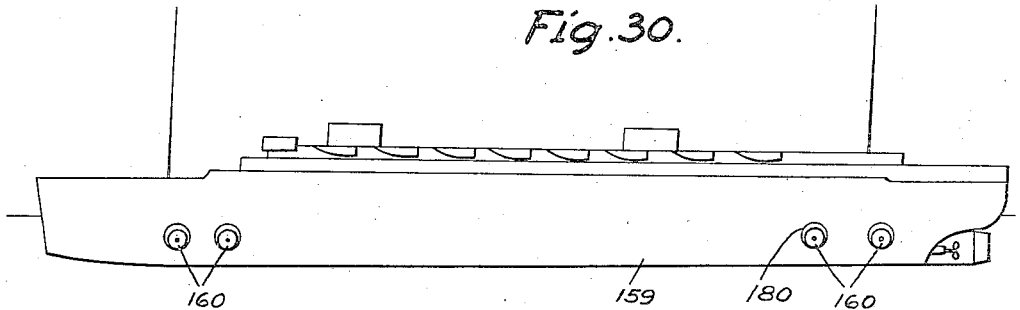
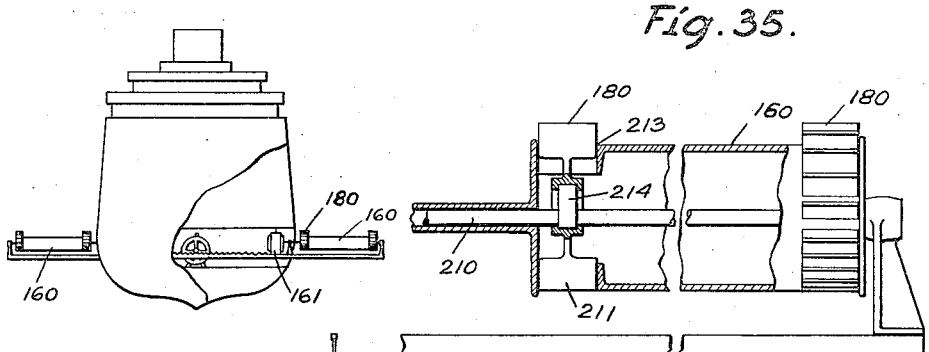
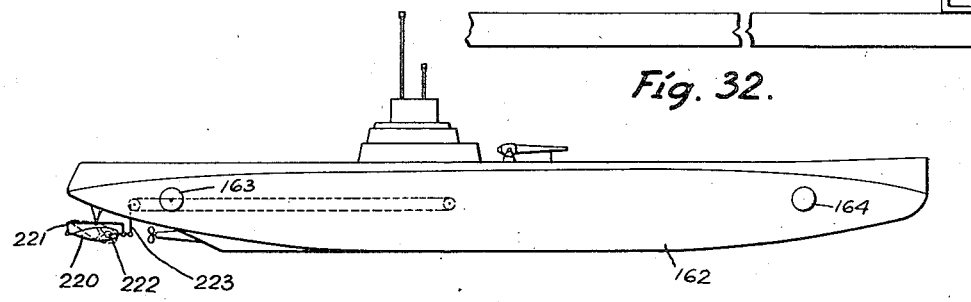
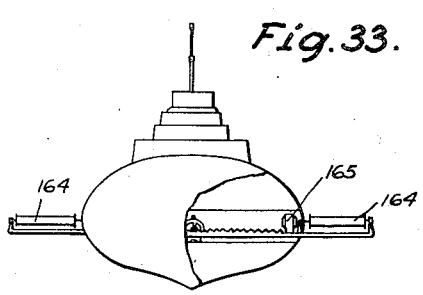
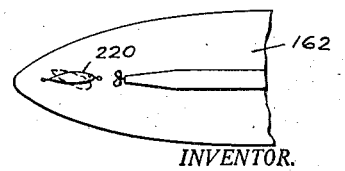

Patented Sept. 19, 1933

1,927,538

UNITED STATES PATENT OFFICE 1,927,538

SUSTAINING AND CONTROL SURFACE

Edward F. Zaparka, New York, N. Y., assignor to Zap Development Corporation, Wilmington, Del., a corporation of Delaware Application March 1, 1930. Serial No. 432,302

40 Claims. (Cl. 244—14)

This invention relates to vehicles that are supported and moved in fluids by the reactions between the fluids and the vehicles. It relates more particularly to air craft, but includes within its scope various forms of water craft.

An object of the invention is to provide an efficient form of lifting surface for air and water craft.

A further object of the invention is to provide efficient control surfaces for air and water craft.

A further object of the invention is the production of an aeroplane which can arise and descend almost vertically with little or no forward speed.

A further object of the invention is to provide dirigible aircraft of the gas envelope type with control surfaces which obviate the necessity for discharging ballast when arising and valving gas when descending.

Other objects will appear from the following descripiton of the operation and utilization of the invention.

This invention is based upon the phenomenon known as the Magnus effect. This phenomena was first explained in "Poggendorff's Annalen" in 1853 by Prof. G. Magnus, a well known Berlin physicist, and is based upon the fact that if a rapidly rotating body and an inviscid fluid in which it is placed move relative to each other in a straight line, a force will act on the body at right angles to the stream line flow of the fluid. The magnitude of this force is dependent upon the extent to which the velocities on one side of the cylinder are increased and to which those on the other side are decreased.

I believe that a rotating symmetrical body utilizing the Magnus effect is a most efficient lifting surface, which will give, for example, a much greater lift than an ordinary airfoil having the same relative drift resistance. In this invention I have applied my discoveries based upon the Magnus effect to aeroplanes, dirigibles, so-called heliocopters, ships and submarines.

In order that the invention and its advantages can be easily understood, the principles governing the lifting action of an ordinary air foil are explained and compared with those governing the lifting action of an airfoil utilizing the Magnus effect, and the many advantages of the latter are pointed out in the discussion of Figs. 1 to 6 inclusive of the drawings.

When a fluid flows past a fixed body it exerts a force on it, and the amount and direction of the force depends on the size and shape of the body, the angle which the body makes with the line of flow, and the velocity of the fluid flowing past it. The same principles of relative velocity apply if the body moves through the fluid. This force or reaction on the body is due partly to the deflection, that is, change of motion of the fluid around the body and partly to the stickiness of the fluid itself, some of which tends to adhere to the body and drag it along. With aircraft this is called skin friction. When a plane encounters an air stream there is a compression of the air on the front face of the plane. Immediately back of the plane there is a rarefaction, so that back of the plane air currents are set up that swing around towards its rear surface. Back of the plane and near the edge there is a turbulent region with complex eddy currents of air.

If a flat plane is held so as to form an angle with the air stream (called the angle of attack), the total pressure of the air against the plane has two components:—a vertical component or lift tending to force the plane upward at right angles to the air stream and a horizontal component or dynamic resistance tending to force the plane backward in the direction of the air stream. The flat plane encountering the air stream disrupts the air, the entering edge and to a lesser extent the trailing edge tending to produce air eddies. This turbulence increases the airfoil resistance if the flat plane is used as an airfoil and it decreases the lift. This turbulence is caused by the plane tending to force a sudden change of direction of motion of the particles of air passing below the plane and an even more violent disturbance of those passing closely above the leading edge. The shock to the particles of air meeting or passing close to the plane can be reduced by modifying the shape of the plane.

Fig. 1 of the drawings show the flow of air past an airfoil having a stream line form. The disturbance of the air by this form of airfoil is minimized by having the surfaces of the airfoil throughout more or less parallel to the stream line flow; the airfoil then enters the air and leaves the deflected air with little disturbance and eddies are eliminated as far as they can be. With such an airfoil, lift is obtained to a certain extent by the positive pressure of the air on the lower surface, but to a much greater extent by the negative pressure or suction on the upper surface. The presence of these areas of negative and positive pressure explains the creation of a downward movement of the air behind the airfoil. The positive pressure on the under surface forces the air down from the bottom of the airfoil, while the area of low pressure on top causes the air above to attempt to flow downward into that area, giving the whole mass of air above a downward movement which is continued and left behind the trailing edge of the airfoil as it passes. It is this downward movement of air which causes the lift of the airfoil. Referring to Fig. 1 it is seen that the upward slope of the upper surface of the entering edge of the airfoil swings the air stream upward over the airfoil before its final deflection downward. This leads to a decrease in pressure on the upper surface and so contributes materially to the lift.

As the angle between an ordinary airfoil and the air stream increases above the point of maximum lift called the burble joint, eddies on the top of the airfoil become more violent and finally the turbulence becomes so great that there is a collapse of air flow along the upper surface of the airfoil and the lift rapidly falls off, this resulting eventually in loss of control of the aeroplane. This condition is illustrated by Fig. 2 of the drawings. An ordinary airfoil is therefore effective only at comparatively small angles of attack, usually less than 12 to 18 degrees. Below their critical angles, ordinary airfoils are more or less efficient lifting surfaces. Above their critical angles they become almost useless as lifting surfaces, and the aeroplane has no stability.

There is no critical angle of attack with airfoils utilizing the Magnus effect. Furthermore, such airfoils are many times more efficient as lifting surfaces for aeroplanes than ordinary fixed airfoils having the same projected area. Fig. 3 illustrates the conditions of air flow around a rapidly revolving cylinder which represents an airfoil utilizing the Magnus effect. The revolving rotor continually offers fresh surface to the air stream which action causes a deformation of the air flow past the rotor. As shown by Fig. 3, the stream particles are deflected from their path on approaching the rotor and a large part rush to the rotor side where the surface of the rotor moves in the direction of the stream flow. The stream lines on that side are crowded together so that the individual fluid particles have to speed up considerably in order that the flow may be continuous. On the side of the rotor where the surface moves in a direction opposed to the stream flow, the stream flow is retarded, the individual stream particles being repelled by the rotor surface and slowed up. Thus on one side of the rotor there is acceleration of the stream flow and on the other side there is retardation. As is well known from Bernoulli's theorum, acceleration of flow causes suction or vacuum, and retardation of flow causes pressure increase. Accordingly with a rotor airfoil revolving in the direction of stream flow, as shown by Fig. 3, a suction or negative pressure zone is created above the rotor and a positive pressure zone is created below the rotor, the result of both being to give the air stream passing the rotor a downward movement, this resulting, as in the case of ordinary airfoil, in the lift of the rotor.

Fig. 4 shows the force diagram of the positive and negative pressure forces acting on the revolving rotor of Fig. 3. The negative pressure area is seen to be much larger than the positive pressure area. The resultant effect of both the positive and the negative pressures is indicated by the heavy arrow.

I propose to use one or more rotors as the sole listing airfoils of aeroplanes, and also propose to use one or more rotors in cooperation with the stream line type of fixed airfoil shown by Figs. 1 and 2.

A rotor airfoil will perform the same functions that the present type fixed airfoil does, it being only necessary that the rotor be kept revolving in the direction of the air stream. With both the rotor airfoil and the fixed airfoil, the lift obtained is directly proportional to the square of the velocity of the moving air stream. The rotor airfoil has the advantage over the fixed airfoil in that it has no critical angle of attack and therefore is able to support an aeroplane at angles far greater than the stalling angles of the present type airfoils. The rotor airfoil has the further advantage in that it is much more efficient, giving many times the lifting force for the same disposed surface. In order that the rotor airfoil may be effective in the case of motor failure, I have provided it with means for rotating it from the air stream. This means may be an air screw. Then in case of motor failure with an aeroplane utilizing rotor airfoils with no fixed airfoil, it is only necessary to glide to a landing as with the ordinary aeroplane.

It has been found preferable, according to the present invention, to mount the rotor airfoils in the slip-stream of the propeller, since in this way with the motor operating there is an air stream of higher velocity in the propeller slip-stream and a correspondingly greater lift developed by the rotor surfaces there placed.

Rotor airfoils are more effective when their surfaces are moving at a velocity greater than that of the air stream. The lift increases with increase of rotor surface speed until the rotor surface speed is approximately four times that of the air stream. I prefer to revolve the rotor airfoils at a rate sufficient to give a rotor surface speed between three and four times that of the air stream, since at such speeds I have found that the greatest lifts are obtained without undue expenditure of energy for revolving the rotors.

By using a rotor airfoil in cooperation with a fixed airfoil, an improved air circulation along the surfaces of the latter may be obtained, this resulting in a more efficient operation of the latter under all conditions of flight.

I propose therefore to use a rotor airfoil with a fixed airfoil to force circulation past the surface of the latter at high angles of attack, where ordinarily the flow would collapse. By this method, I believe that better results are obtained than by the slotted wing arrangement attributed to Handley Page. As previously discussed, Fig. 2 shows the condition of collapse flow past an ordinary airfoil, where the violent eddy currents of air prevent the flow of the air stream along the upper surface of the airfoil. One way of restoring the flow along the surface of the air foil at such high angles of attack, is the slotted wing above referred to. This arrangement is illustrated by Fig. 5 of the drawings where 35 is an airfoil arranged at the same angle of attack as that shown in Fig. 2. The small auxiliary airfoil 36 is arranged near the leading edge of the main airfoil 35 so that when the airfoil 35 is set at a very high angle of attack, as indicated by Fig. 5, the small auxiliary airfoil 36 is set at a small angle to the air in its immediate neighborhood and there is, therefore, a smooth stream line flow over its upper surface. The down wash of the air flowing off from the trailing edge of the small airfoil 36 turns the lines of flow down along the upper surface of the main airfoil 35, thus resisting the collapse of flow which would occur without some auxiliary flow-restoring means.

In Fig. 6 is illustrated the flow conditions obtained through the association of rotor airfoils with fixed airfoils. Arranged above and below the fixed airfoil 36 are the rotor airfoils 38 and 39, respectively, these rotor airfoils being adapted to revolve at high speed in the direction of the air stream. The airfoil 37 is shown at the same high angle of attack as that of the airfoil in Fig. 2, and the main airfoil 35 in Fig. 5. The rotor airfoils 38 and 39 are arranged near the trailing edge of the fixed airfoil 37 in order that their action will aid to the greatest extent and in fact increase the beneficial effects of the air flow past the surface of the fixed airfoil 37. As shown by Fig. 6, stream line particles are first drawn by the upper rotor airfoil 38 above and along the upper surface of the fixed airfoil 37. The air as it leaves the rotor 38 is then deflected downward past the trailing edge of the fixed airfoil 37. Both of these actions are effective in restoring the air flow completely along the upper surface of the fixed airfoil. In addition, the rotor airfoil 39 arranged below the fixed airfoil 37 plays a substantial part in maintaining the flow along the surfaces of the fixed airfoil. As shown by Fig. 6, the air flow along the undersurface of the fixed airfoil near the trailing edge is accelerated by the rotation of the rotor 39. This causes an increased pressure on the undersurface of the fixed airfoil. Also the air as it leaves the rotor 39 is propelled at high speed past the trailing edge of the fixed airfoil, and this tends to force by suction the flow of air along and past the upper portion of the trailing edge, thus increasing the flow along the upper surfaces of the fixed airfoil. The action of the rotors 38 and 39, as described, not only renders the fixed airfoil 37 effective at very high angles of attack, but makes the fixed airfoil more efficient under all conditions of flight. While rotors both above and below the fixed airfoil have been illustrated, and their action described, it is not necessary that more than one rotor be used, since were the upper rotor 38, or the lower rotor 39, used alone with the fixed airfoil 37, increased performance of the latter would be obtained.

In the preceding paragraph the benefits of rotors in their aiding action on associated fixed airfoils have been explained. In addition to the increased lift from the fixed airfoil caused by the associated rotor or rotors, there is the additional lift of the rotors due to the Magnus effect. It is not necessary that aeroplanes, according to my invention, have combined fixed airfoils and rotor airfoils. From a standpoint of efficiency, it may be preferable to use rotors as the only airfoils, since a rotor airfoil gives many times the lift that a fixed airfoil having the same drag does. But other factors such as maximum forward speed and maximum safety of flight, as will be hereinafter more fully explained, have caused me to select, as one of the preferred embodiments of my invention, aeroplanes employing both fixed airfoils and rotor airfoils, it being my intention to utilize the rotor airfoils to the fullest extent for arising and descending, and to utilize the fixed airfoils to the fullest extent in obtaining the desired high, forward speed. This may be done by exposing the entire surface of the rotors while ascending or descending, and by decreasing the effective rotor surface when the desired altitude is obtained to move forward at high speed.

Referring now to Figs. 7 to 35 inclusive of the drawings, Fig. 7 is a side view of a monoplane utilizing rotor airfoils above and below the fixed airfoil;

Fig. 20 is a side view of an aeroplane utilizing a rotor airfoil in conjunction with a fixed airfoil. The rotor airfoil is adapted to be withdrawn within the surface of the fixed airfoil and the horizontal stabilizer of the aeroplane is automatically adjusted with movement of the rotor to maintain balance of the machine;

Fig. 21 is a view of that portion of the control apparatus of Fig. 20 that is adapted to be varied;

Fig. 22 is a partial top view of the airfoils together with the mechanism for adjusting the rotor.

Fig. 30 is a side view of an ocean liner fitted with rotors for decreasing the water displacement thereof and with paddle wheels used with the rotors for driving the vessel;

Fig. 31 is a front view of the liner shown by Fig. 30;

Fig. 32 is a side view of a submarine fitted with rotor control surfaces for expediting maneuvers;

Fig. 33 is a front view of the submarine of Fig. 31;

Fig. 34 is a bottom view of the submarine of Fig. 31; and

Fig. 35 is a detail view partially in section of the rotor arrangement shown by Fig. 30.

Figure 1:
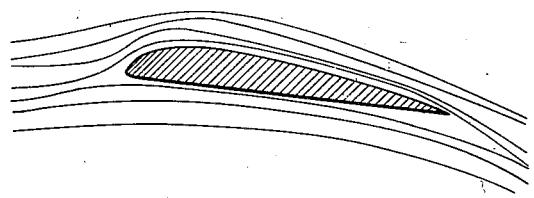
Figure 2:
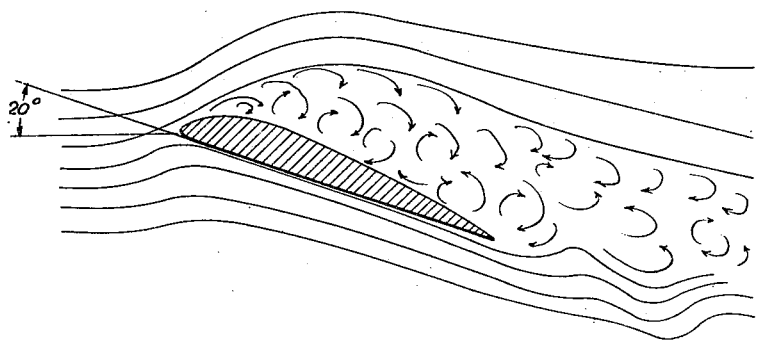
Figure 3:
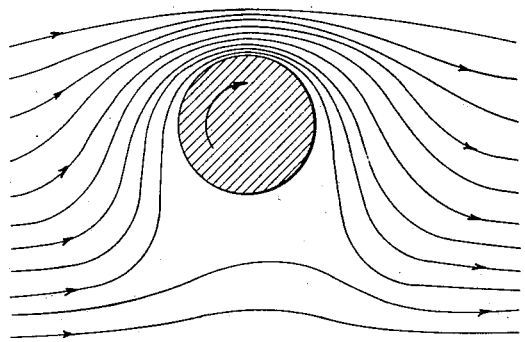
Figure 4:
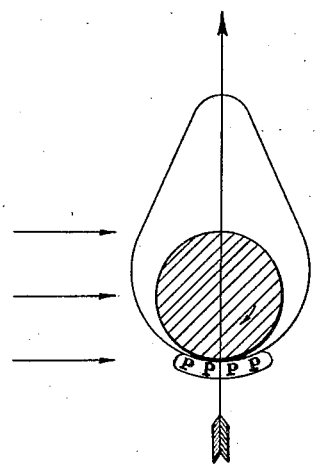
Figure 5:
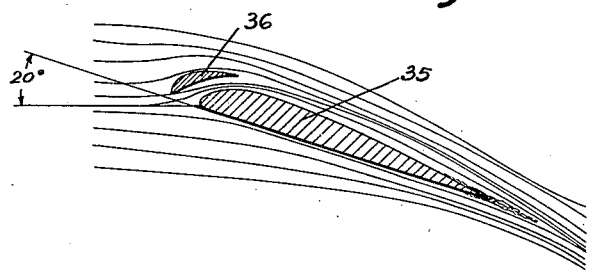
Figure 6:
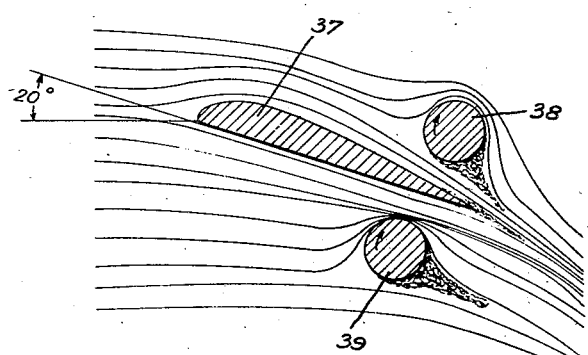
Figure 7:
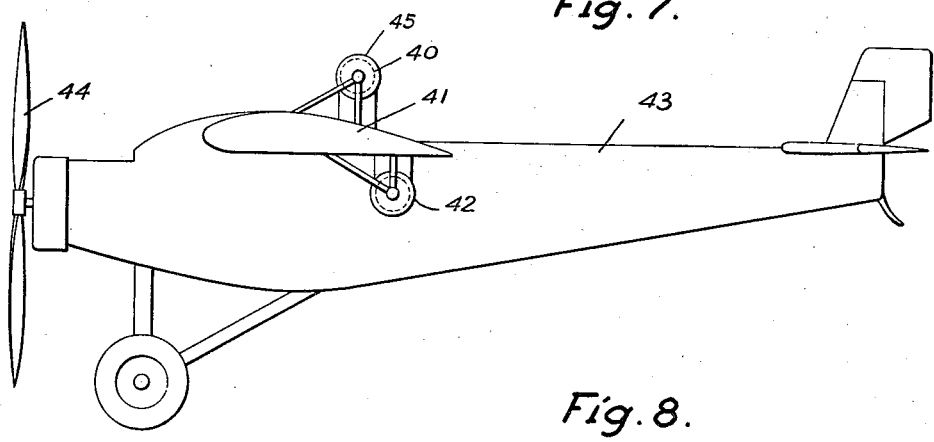
Figure 8:
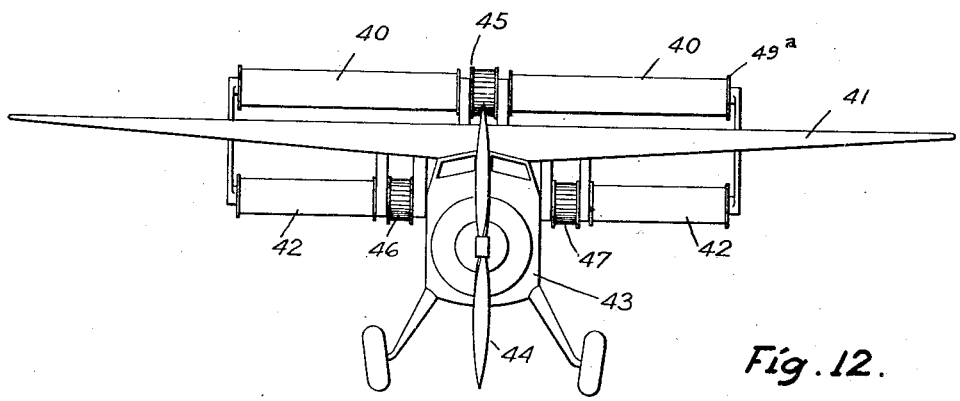
Fig. 8 is a front view of the monoplane in Fig. 7.

Figs. 7 and 8 illustrate an aeroplane employing a fixed airfoil together with cooperating rotor airfoils, the advantages of this arrangement having already been described in connection with Fig. 6. The rotor airfoil 40 is arranged above the fixed airfoil 41; the rotor airfoil 42 is arranged below the fixed airfoil 41; the rotor airfoils and the fixed airfoils being suitably affixed to the fuselage of the airplane 43. The propeller 44 is rotated by the engine (not shown) on the airplane 43 to provide its propelling means. The rotor 40 has attached thereto the air turbine 45 and the rotor airfoil 42 has attached thereto the air turbines 46 and 47 which, being rotated by the air stream from the propeller 44, rotate the rotor airfoils. These air turbines 45, 46 and 47 may be attached directly to the rotor airfoils or may be suitably geared thereto so as to cause the rotor airfoils to rotate at a higher speed than that at which the turbines rotate.

Figure 9:
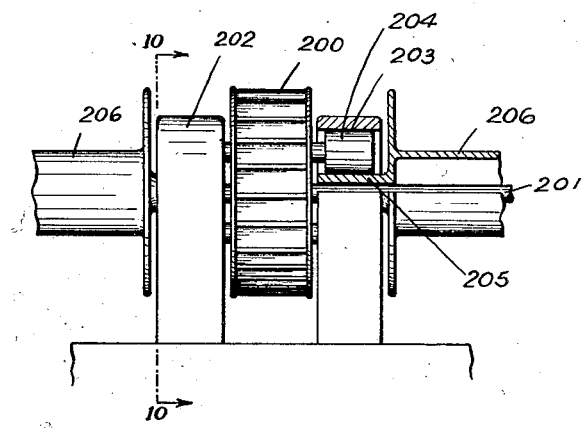
Fig. 9 is a front view partially in section of the turbine and its step-up gear for driving the rotors in Figs. 7 and 8.
Figure 10:
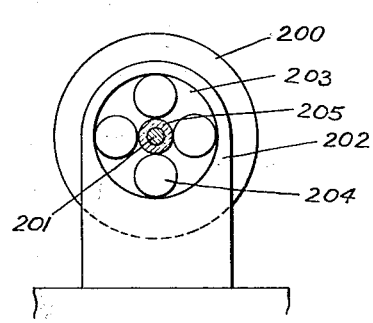
Fig. 10 is a sectional view taken along the line 10—10 of Fig. 9.

Figures 9 and 10 illustrate one way of gearing the turbines to the rotor airfoils in order to increase the speed of the latter. The turbine 200 is mounted on the shaft 201 which in turn is adapted to be rotatively supported by the pedestal 202. The friction rollers 203 carried by the turbine 200 bear against the upper surfaces 204 of the pedestals 202 and against the roller surfaces 205 of the rollers 206. The turbine 200 on revolving causes, through the geared arrangement shown, the rotors 206 to revolve at the higher speed. As before stated, I prefer that the rotor surfaces move at a speed between three and four times that of the air stream.

Figure 12:
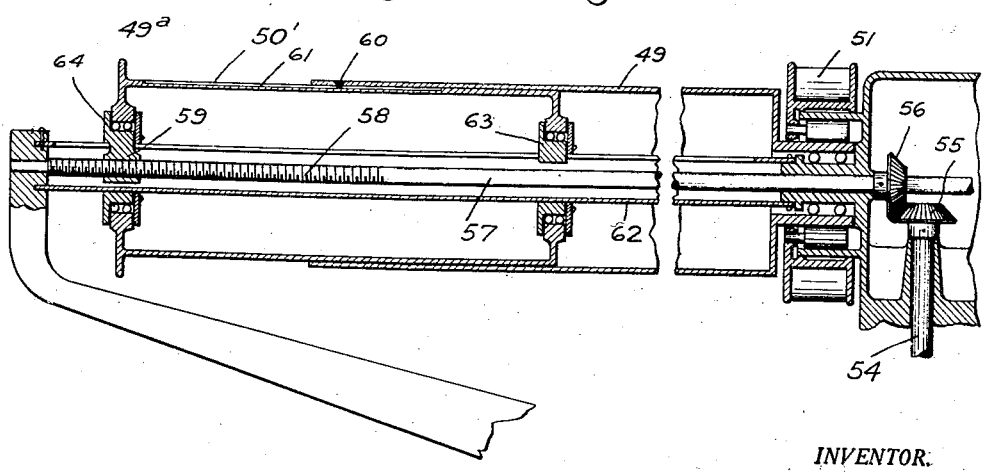
Fig. 12 is a partial sectional view of the rotor airfoil shown by Fig. 11 showing the mechanism for expanding the same.
Figure 11:
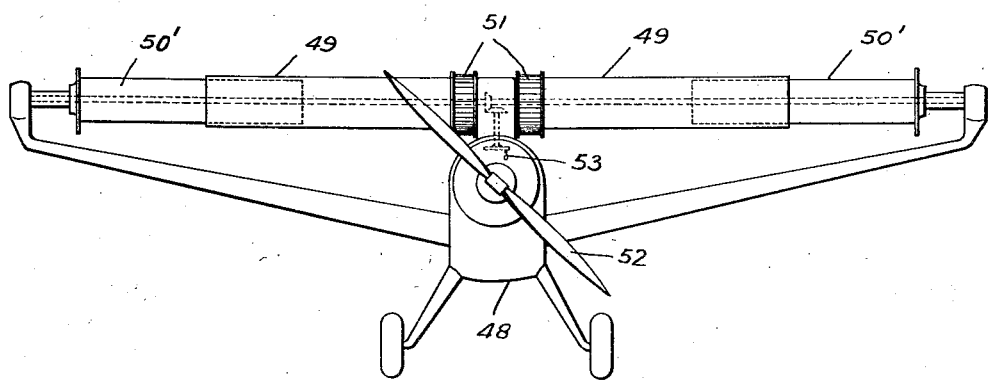
Fig. 11 is a front view of an aeroplane, the sole lifting surface of which is a rotor airfoil. The airfoil illustrated is adapted to be expanded to offer a variable lifting surface.

The aeroplane 48 shown by Fig. 11 has an expansible surface rotor airfoil 49. This rotor airfoil 49 is the sole airfoil used. The rotor airfoil 49 comprises a fixed portion within which the variable portions 50 and 50' are adapted to slide. The rotor airfoil is propelled by the air turbines 51 from the slip stream of the propeller 52 or from the air stream passing the plane 48 in case the motor of the aeroplane is inoperative. The expansible portions 50 and 50' of the rotor airfoil can be telescoped at will by the pilot of the aeroplane 48 through adjustment of the control wheel 53. The rotation of the control wheel 53, as shown in more detail by Fig. 12, rotates shaft 54 with its bevel gear 55 and the bevel gear 56 geared therewith. The rotation of the bevel gear 56 rotates the threaded shaft 57, on the threads 58 of which the threaded flange nut 59 of the rotor surface 50' is supported. The rotation of the shaft 57 causes movement of the flange nut 59 thereon which, in turn, causes the adjustable rotor surface 50' to slide in and out of the fixed rotor surface 49. The adjustable rotor surface 50' is keyed by means of the key 60, which is held in slot 61 so that the control surfaces rotate together. The rotor control surfaces 49 and 50' are supported on the hollow shaft 62 by means of the bearings 63 and 64. By having this expansible rotor airfoil surface a very safe and at the same time efficient aeroplane is provided. With the motor functioning normally the air stream supplied by the propeller 52 is sufficient to maintain flight with the rotor airfoil non-extended. In case of motor failure the pilot, by adjustment of the control wheel 53, can quickly increase the active rotor surface. The rotor surfaces 49, 50 and 50' then are rotated by the turbines 51 from the air stream passing the machine in a very flat angle of glide, the extended rotor surfaces enabling a relatively slow forward speed to be maintained. With such an arrangement the aeroplane can extend its gliding range, can descend very slowly and land in a very small space. The turbines 51 through the speed multiplier contained therein drive the rotor surfaces at a speed approximately three times that of the air stream. The end portions 49a of the rotor surfaces are plates having greater diameter than that of the rotors and serve to prevent the circulation of air around the ends of the rotors.

Figure 13:
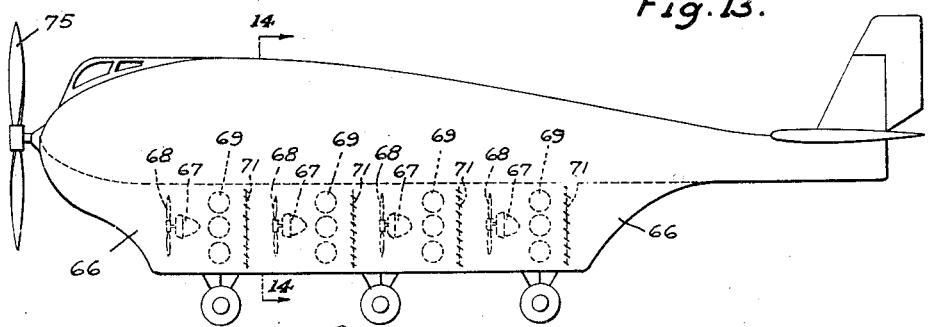
Fig. 13 is a side view of an aircraft comprising a tunnel arrangement with a plurality of propellers, motors and rotors successively arranged therein.
Figure 14:
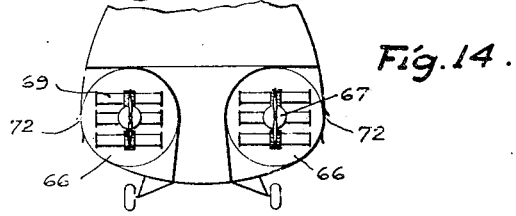
Fig. 14 is a partial sectional view along the line 14—14 of the aeroplane in Fig. 13.

The streamlined aircraft shown by Figs. 13 and 14 has, in its lower portion, the enclosures 66 within which are contained the plurality of motors 67, the propellers 68, the rotor airfoils 69 and the deflecting shutters 71. The propeller 75 in the nose of the aircraft is driven by a suitable power source and serves to drive the aircraft forward. The enclosures 66 are open at both ends to permit free circulation of the air and may be open below the rotor airfoils 69 to permit downward movement of the air displaced by the rotor airfoils. The vertical sides of the enclosures 66 contain the vents 72 which permit air to be drawn into the enclosures 66 adjacent the rotor airfoils. The rotor airfoils 69 have mounted thereon the air turbines 70 for revolving them from the air stream produced by the propeller 68 driven by the motors 67, but they may be driven directly or through suitable gears by the motors. The equipment within the enclosures serves to lift the aircraft. The air stream produced by the propellers 68 drives the rotor airfoils 69 through the air turbines 70. The revolving rotor airfoils, as has previously been explained, cause a downward movement of the air passing them. The air passing the rotor airfoils is deflected substantially vertically downward by the shutters 71. The shutters produce drag which reduces the speed of the aircraft. The shutters are adjustable to variable deflect the airstream and their action is explained in more detail in the description of Figs. 18 and 19 of the drawings.

The space above the enclosures 66 may be used for the conveyance of freight or passengers. The aircraft has a stream line shape in order that high forward speed may be obtained. With this type of machine a tremendous amount of weight can be lifted. It should be a very efficient and profitable freight or passenger carrier. With the plurality of rotor airfoils and their cooperating motors and propellers thus enclosed, the greatest possible benefit of the Magnus effect is obtained. The lifting effects of the rotors are utilized to their maximum extent. The air, as it passes the first bank of rotors, is accelerated and given a downward movement. This action is repeated and amplified by the succeeding banks of rotors so that in addition to having a great amount of effective lifting surface in a comparatively small space, the rotor air foils are operated under most efficient conditions. The factor of safety is great for should one or more motors fail, there are sufficient remaining to support the aircraft.

Figure 15:
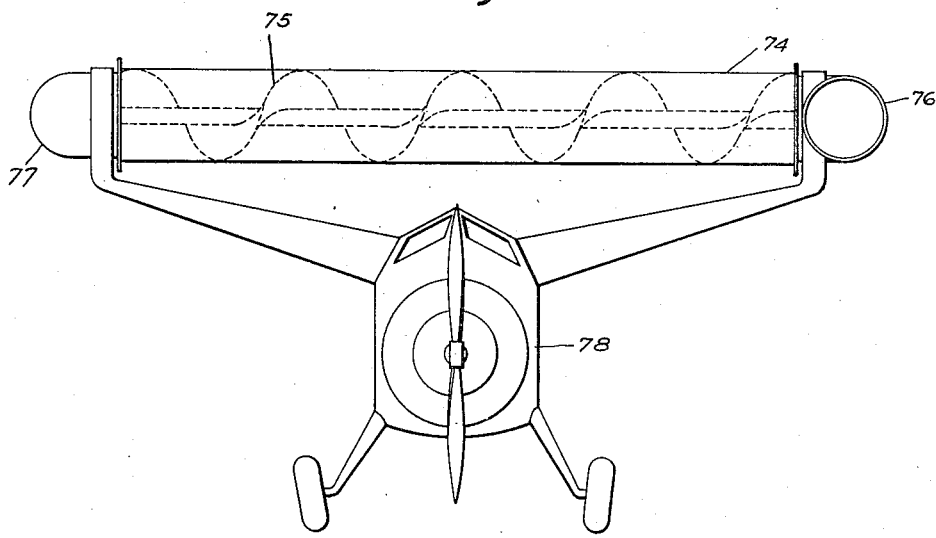
Fig. 15 is a front view of an aeroplane utilizing a rotor airfoil and illustrates an air screw placed inside the rotor for the purpose of rotating the airfoil from the force of the air stream.

The rotor airfoil 74, mounted on the airplane 78, and shown by Fig. 15, has contained therein and secured thereto the air screw 75 (shown in dotted lines). At one end of the rotor 74 a deflecting screen 76 is so placed that a portion of the air stream is deflected into one end of the rotor 74. At the other end of the rotor 74, the deflecting screen 77 is so placed that the air which entered through the opposite end of the rotor is deflected out of the rotor and into the air stream without opposing the air stream. The air stream passing the deflecting screen 77 tends to pull the air from the rotor 74. The proportions of the air screw 75 may be so chosen as to provide, for a given air speed, a speed of rotation of the rotor most suitable for the particular air speed.

Figure 16:
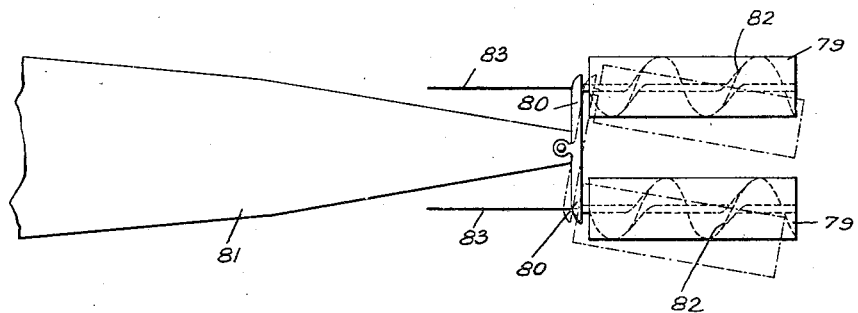
Fig. 16 is a top view of the rear control surfaces of an aeroplane using rotor airfoils as control surfaces.
Figure 17:
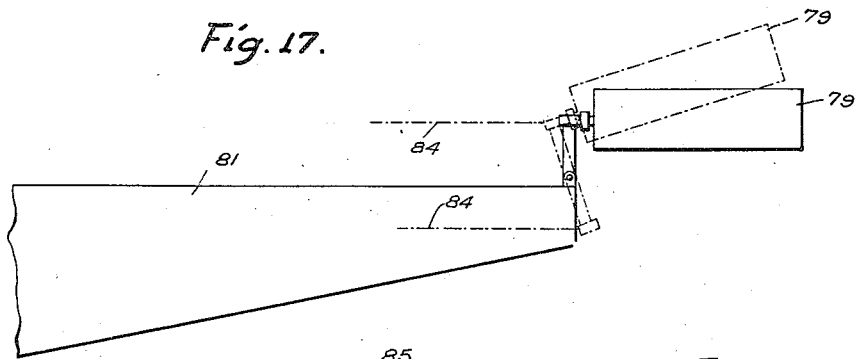
Fig. 17 is a side view of the control surfaces of Fig. 16.

Figs. 16 and 17 illustrate rotor control surfaces applied to an airplane. The rotors 79 are mounted on the control bar 80 of the airplane 81. Within the rotors 79 are contained the air screws 82 which are similar to those described in Fig. 15. With the airplane to which they are attached moving forward, the rotors 79, through the pressure of the air stream on the air screws 82, are caused to rotate, in a counter-clockwise direction. When the rotors are arranged in planes parallel to the air stream, no forces are exerted by the rotors since in this condition the air stream is parallel to the rotor surfaces and does not coact therewith. This is a condition of normal horizontal flight. When it is desired that the airplane descend, the rotors 79 are moved by the control wires 83 to the position shown by the dotted lines in Fig. 16. The air stream now strikes the rotor surfaces at an angle. Since the rotors are revolving in a counter-clockwise direction, the thrust given by the displacement of the air by the rotating rotors is in the direction at right angles to and out of the plane of the drawing. This thrust tends to dive the airplane and corresponds to a condition of depressed elevator in an ordinary airplane. Likewise by moving the rotors 79 by means of the control wires 83 to the other side of their mid position, a thrust corresponding to raised elevator is obtained resulting in climb. The greater the displacement of the rotors 79 from their mid position, the greater the elevator action.

In Fig. 17 the rotor control surfaces 79 are seen to perform the function of the ordinary airplane rudder. With the rotors in the position indicated by the dotted lines of Fig. 17, the thrust is into the plane of the drawing which, as in the case of the force on an ordinary rudder, tends to cause the airplane to turn to the left. The rotors 79 may be elevated or lowered by means of the control wires 84. With the rotors depressed below their mid horizontal position, the thrust would be out of the plane of the drawing, causing the airplane to turn to the right. Obviously the rotor control surface shown may be made to perform simultaneously the functions of the ordinary elevator and rudder.

Figure 23:
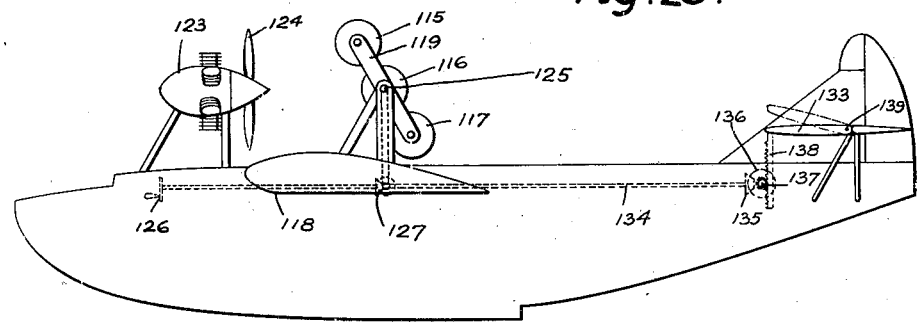
Fig. 23 is a side view of a flying boat utilizing three rotor control surfaces in conjunction with a fixed airfoil with means for rendering one or more of the rotors ineffective, together with means for automatically adjusting the horizontal tail stabilizer to maintain balance of the machine.
Figure 24:
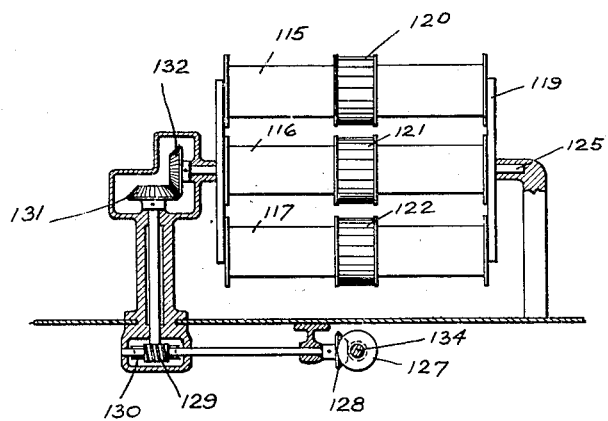
Fig. 24 is a view partially in section of the rotor varying control of Fig. 22.
Figure 18:
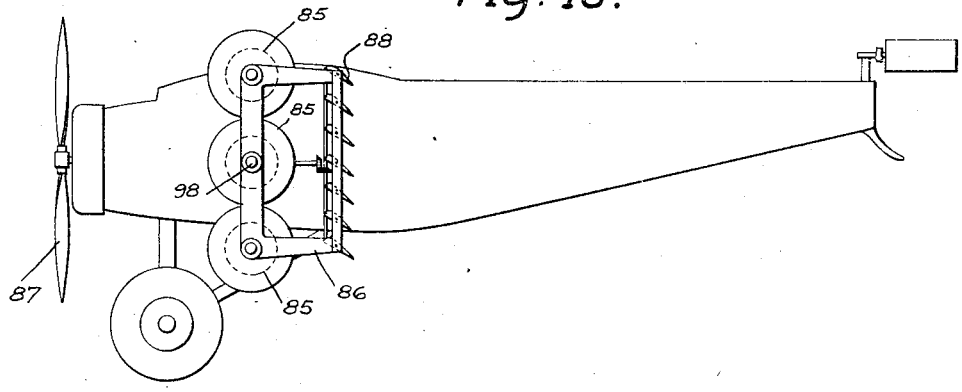
Fig. 18 is a side view of an aeroplane utilizing rotor airfoils with a shutter arrangement for deflecting the air stream from the rotors vertically downward in order to obtain substantially vertical ascent and descent.
Figure 19:
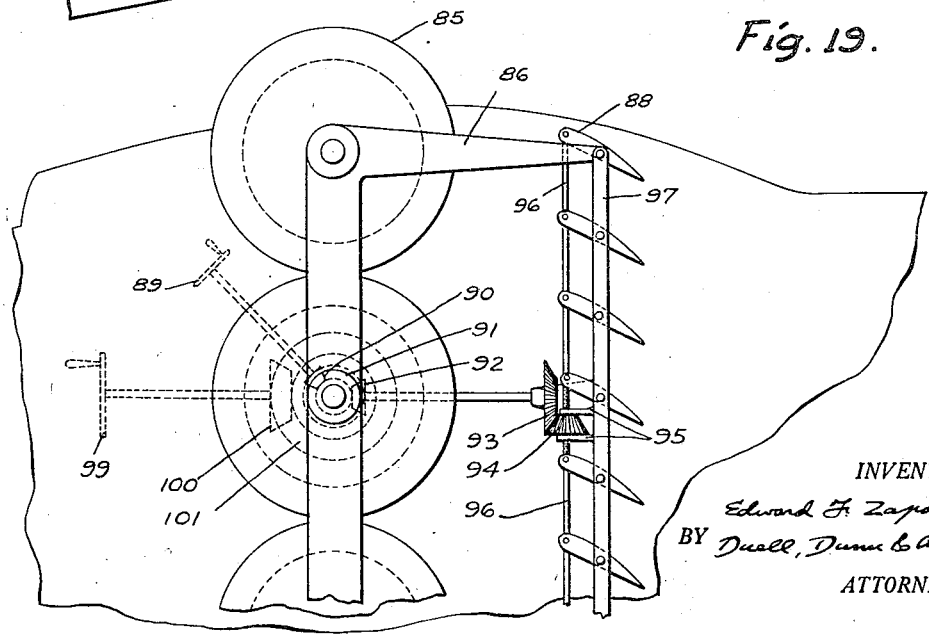
Fig. 19 shows the details of the control arrangement for actuating the shutters of Fig. 18.

In an ordinary airplane, the air displaced by the airfoil has a downward and rearward direction. The thrust is not completely downward but is at an angle. In the airplane illustrated by Figs. 18 and 19, there is provided means for deflecting the air passing the rotor airfoils substantially vertically downward. The rotors 85 are supported within the frame 86 behind the propeller 87, and are provided with air turbines such as those shown in Figs. 8 and 9 in order that the rotors 85 may be revolved from the air stream. The shutter foils 88 are supported to the frame 86 and are so arranged that they may be opened or closed at the will of the pilot of the machine. In their open position, as shown by Fig. 18, the small foils 88 act as airfoils, contributing to the lift of the machine. This is a condition of horizontal flight. When the pilot wishes to ascend or descend at a very steep angle, he actuates the control wheel 89, which revolves the bevel gears 90, 91, 92, 93 and 94, as shown by Fig. 19. The bevel gear 94 is held fixed by the journals 95 and is internally threaded. The shaft 96 is threaded and screws into the internal threads of the gear 95 so that when the gear 95 revolves the shaft 96 moves up or down within the gear 95. The small foils 88 are attached at their leading edges to the shaft 96 and are pivoted on the rear portion 97 of the frame 86. Thus, by movement of the control wheel 89, the shutters may be adjusted to be full opened as shown by Fig. 19, or may be adjusted to a full closed condition, as shown by the dotted lines in Fig. 18. With the shutters full closed, the air stream past the rotor airfoils 85 is deflected vertically downward. There is, therefore, but little forward thrust and the airplane is enabled under full control to rise or descend at a sharp angle. With the motor of the airplane operating at full speed, the plane will, of course, rise at a very sharp angle. If the pilot wishes to descend at a sharp angle, he throttles the motor back until the downward thrust of the rotors is slightly less than the forces of gravity working on the machine, so that the machine descends almost vertically at a low rate of speed. With the three rotors 85 in the positions indicated by Figs. 18 and 19, the maximum lifting effect is obtained. This is the desired position of the rotors 85 when the airplane ascends or descends. But when the airplane has reached the desired altitude, and it is desired that it go forward at its greatest speed, it is necessary to render the rotors 85 less effective. This is done by adjusting the position of the frame 86, and the rotors 85, so that instead of being arranged vertically as shown by Figs. 18 and 19, they are arranged parallel to the longitudinal axis of the airplane. With the particular embodiment illustrated by Figs. 18 and 19, the frame 86 is rotated in a counterclockwise direction around the bearing 98. Then with the small foils 88 in their closed position, these airfoils are all parallel to the axis of the machine and collectively act as an ordinary fixed airfoil. The top rotor 85 of Fig. 18 will now be in front of the other two rotors, so that the second and third rotors give less lifting effect so that the available energy of the power plant may be utilized for increased speed. The position of the frame 86 is varied by adjustment of the control wheel 99 which rotates the bevel gears 100 and 101. The bevel gear 101 is fixed relative to the frame 86 and on rotating changes the angle of the frame 86 relative to the axis of the machine. Figs. 23 and 24 illustrate in more detail how the effectiveness of the several rotors may be controlled by the pilot of the machine.

Figs. 20, 21, and 22 illustrate a rotor airfoil used in cooperation with a fixed airfoil. Full use is made of the rotor airfoil in climbing and descending and the rotor is adapted to be rendered ineffective when the desired altitude is attained in order that high forward speeds may be obtained. The aeroplane 102 has mounted thereon a fixed airfoil 103. Supported on the shaft 104 is the rotor airfoil 105, which is provided with the air turbine 106 to rotate it from the air stream. The fixed airfoil 103 has built therein the movable shutters 107 which normally are kept closed through the pressure of the double-acting spring hinges 108. When it is desired that the aeroplane 102 climb or descend at a sharp angle or perhaps support a very heavy load in normal flight, the rotor airfoil 105 is exposed to the full force of the slip stream of the propeller 180. This is the position indicated by the dotted lines in Figs. 20 and 21. When a high forward speed is desired, the rotor airfoil 105 is withdrawn into the fixed airfoil 103 through the shutters 107. To change the position of the rotor airfoil 105 the pilot of the aeroplane adjusts the control wheel 109 which rotates by means of the belt 110 the nut 111 which is threaded to take the threaded shaft 104 and is so supported by the pivoted journal 113 that on rotation the threaded shaft 104 is screwed through it. The rotor airfoil 105 is rotatively mounted on the threaded shaft 104 and on one end of the shaft 114. The other end of the shaft 114 is rotatively mounted on the cross member 170. By rotation of the control wheel 109 the rotor airfoil may be drawn in or out of the fixed airfoil 103 by the movement of the threaded shaft 104. The shutters 107 allow entry and withdrawal of the rotor airfoil 105 and close themselves before or after withdrawal of the rotor so that the stream line form of the fixed airfoil 103 is maintained unbroken. Obviously, as the rotor airfoil 105 is moved, its drift resistance affects variably the balance of the machine. Were there no compensating adjustments provided, with the aeroplane in balance for horizontal flight, with the rotor fully exposed to the slip stream, on withdrawal of the rotor 105 within the fixed airfoil 103 the aeroplane will become nose-heavy. In the same way, if the aeroplane was in perfect balance for horizontal flight, with the rotor within the fixed airfoil 103, upon exposure of the rotor airfoil to the full force of the slip stream, the aeroplane would become tail-heavy. In order to compensate for this disturbance of the balance of the machine there is provided automatic adjustment of the horizontal stabilizer. As the control wheel 109 is rotated to move the rotor airfoil 105 in or out of the fixed airfoil 103, the bevel gears 171, and 172, the shaft 173, the bevel gears 174 and 175, and the spur gear 176 are rotated. The rack gear 177 is geared with the spur gear 176 so that, upon rotation thereof the rack 177 is moved up and down. The horizontal stabilizer 178 is attached at one end to the upper end of the rack 177 and is pivoted at its other end. The rotation of the control wheel 109, as it changes the position of the rotor airfoil 105, simultaneously changes the position of the horizontal stabilizer 178, the relations between the adjustments being such that the aeroplane is kept in perfect balance regardless of the position of the rotor airfoil 105.

Figs. 23 and 24 show a flying boat utilizing three rotor airfoils 115, 116 and 117 in conjunction with a fixed airfoil 118. The three rotor airfoils are supported within the frame 119 and are adapted to be rotated by the air turbines 120, 121 and 122 respectively from the air stream. The motor 123 with its propeller 124 is mounted in front of the rotor airfoils in order that the latter may be in the slip stream of the propeller. The frame 119 which sustains the rotor airfoils is pivotally mounted at its center on the shaft 125 so that the angle the frame 119 makes with the horizontal axis of the flying boat may be varied by the pilot of the machine. With the frame 119 at an angle of 90° with the axis of the flying boat, the three rotors 115, 116 and 117 are mounted vertically above each other. In this position the maximum effect from each rotor is obtained in flight. When the flying boat has reached the desired altitude, the lifting effect of the rotor airfoils may be decreased by changing the angle the frame 119 makes with the horizontal axis of the flying boat. With the frame 119 parallel to the horizontal axis, only the lifting effect of the rotor 115 is fully utilized since the rotors 116 and 117, being in line behind it, do not obtain the full effect of the air stream. In this position the lift is decreased, the drag of the rotor airfoils is decreased and the full effect of the motor 123 can be utilized to obtain the highest forward speed.

Fig. 24 shows the details of the mechanism by which the frame 119 is varied. The control wheel 126 is adjusted by the pilot and rotates the bevel gear 127, which in turn rotates the bevel gear 128, worm gear 129, gear 130, bevel gear 131, and bevel gear 132 to rotate the frame 119 about the shaft 125. In order that the balance of the flying boat may not be disturbed by the change of angularity of the frame 119, the horizontal tail stabilizer 133 is adjusted automatically with the change of angle of the frame 119 by the control wheel 126. This is done as shown by Fig. 21 by the shaft 134 which, on movement of the control wheel 126, rotates the bevel gear 135, bevel gear 136, and the spur gear 137, the rotation of the latter lifting the entering edge of the stabilizer 133 which is attached to the rack 138. As the angle of the frame 119 is varied, the moment caused by the resistance of the rotors to the air stream varies. This change in moment disturbs the balance of the flying boat. The horizontal stabilizer 133, by undergoing a change of adjustment with every change of angle of the frame 119, automatically compensates for the change in thrust caused by the change of position of the rotor airfoils.

Figure 25:
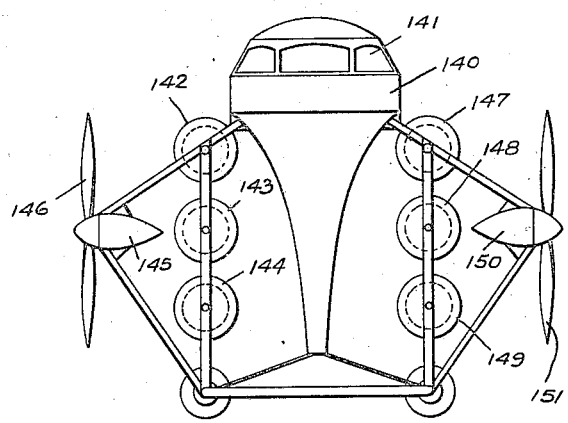
Fig. 25 is a side view of a heliocopter observation machine utilizing rotors as lifting airfoils.
Figure 26:
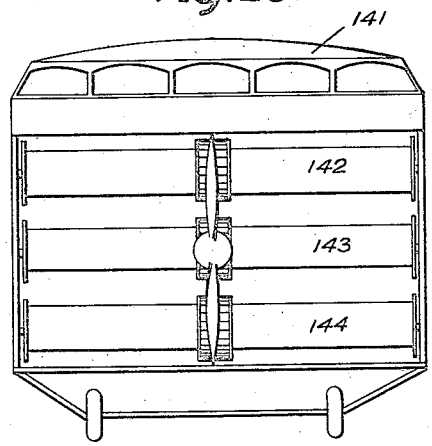
Fig. 26 is a front view of the heliocopter of Fig. 24.

In Figs. 25 and 26, I have shown a type of aircraft which may be used for observation purposes, and in which in case of war could be used to replace the very dangerous gas filled observation balloons which have been heretofore used. The aircraft 140 has mounted thereon the observation platform 141. The rotors 142, 143 and 144 are arranged on one side of the structure and are adapted to be rotated by and cooperate with the air stream produced by its propeller 146. The side of the aircraft 140 adjacent the rotors 142, 143 and 144 is so angled as to cause the total air stream passing the rotors 142, 143 and 144 to be deflected vertically downward. On the opposite side of the aircraft structure, the rotors 147, 148 and 149 are arranged. The motor 150 revolves the rotors 147, 148 and 149 and the propeller 151 serves to create the air stream which coacts with the rotors. The side of the structures adjacent the rotors 147, 148 and 149 is so angled as to cause the air stream passing these rotors to be deflected vertically downward. Since with this type of structure two equal opposing air streams are utilized, there is no forward motion of the device when the motors are running at the same rate of speed. Of course, should it be desired to move parallel to the ground to overcome the action of the wind, or for other reasons, one of the two motors may be rendered less effective than the other, this causing a side movement of the device. While for the purpose of illustration only two sets of opposing motors and rotors are shown, it should be understood that any suitable number may be used. The deflecting sides may be sides of a four, six or eight sided figure.

With the present type of gas filled observation balloons, as is well known, in case of attack by enemy aircraft it is difficult to pull down the unwieldy balloons in time to prevent their being destroyed. Since the balloons are usually supported by inflammable gases, they are easily destroyed by machine gun bullets. With this type of observation aircraft, its ascent or descent is under the control of its operator. In case of emergencies it can be made very quickly to lose its altitude and as a further factor of safety can be made entirely of metal, thus avoiding the danger of fire.

Figure 27:
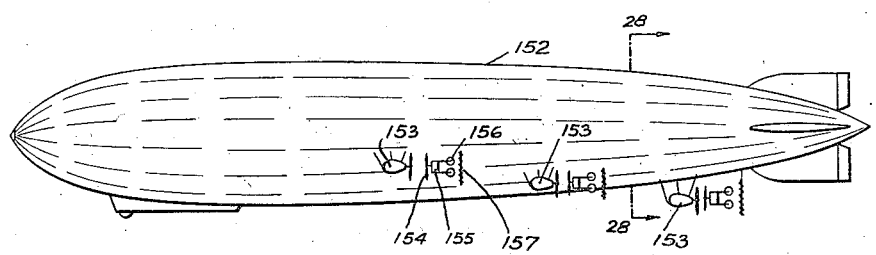
Fig. 27 is a side view of a dirigible type aircraft utilizing rotor airfoils for enabling the dirigible to ascend without the necessity of discharging ballast and to descend without the necessity for valving gas.
Figure 28:
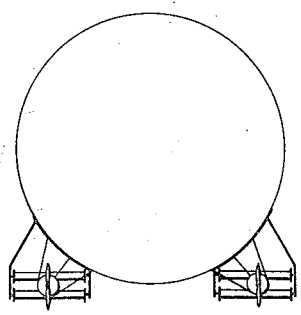
Fig. 28 is a sectional view along the lines 28—28 of the dirigible in Fig. 27.
Figure 29:
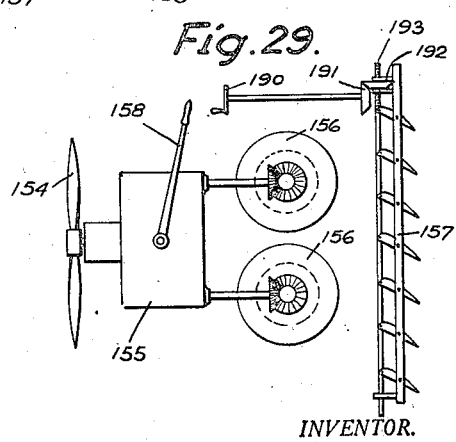
Fig. 29 is a view of the gear shifting arrangement for reversing the direction of rotation of the rotors shown in Figs. 27 and 28.

In Figs. 27, 28 and 29, I have shown the use of rotor airfoils with a Zeppelin type dirigible. As is well known, it is difficult to control the ascent and descent of this type of aircraft, owing to the difficulty of balancing the lifting force of the contained gases against the forces of gravity. When it is desired to leave the ground with such an aircraft, it is necessary to discharge ballast in order that the aircraft may arise. Then when it is desired to descend, it is necessary to valve gas in order that the lift may be decreased to effect the descent. Then again the lifting effect of the gases changes with the temperature of the surrounding air. In hot air, the lift is increased. In cold air, the lift is decreased. My arrangement overcomes the difficulties explained above. The dirigible 152 has the ordinary propelling power plants 153. Behind these power plants in the slip streams of the propellers, I have provided the rotor air foils 156. The propellers 154 rotate through the gear box 155 the rotors 156. Behind the rotors 156 are the adjustable shutter type foils 157 such as have been described in connection with Figs. 18 and 19. The gear box 155 is provided with a shift lever 158 for changing the direction of rotation of the rotors 156. The shutter foils 157 are opened and closed by rotation of the control wheel 190 the bevel gears 191 and 192 and the corresponding movement of the shutter control shaft 193. Assuming the dirigible 152 to be on the ground or secured to its mooring mast, and it is desired that it ascend, the power plants 153 are operated at full speed and the shutters 157 are closed by adjustment of the control wheel 190. The reversing gear shift lever 158 is arranged so that the rotors 156 are revolved by the action of propeller 154 through the gear box 155 in the direction of the air stream. The air stream past the rotors 156 is deflected downward. The lift so developed is sufficient, with the lift of the gases contained in the dirigible 152, to permit the dirigible to arise without the necessity of discharging ballast. Once the dirigible 152 has attained its desired altitude, the shutters 157 are placed in their full open position so that the dirigible may move forward at its maximum speed.

When it is desired to descend, the shutters 157 are again closed. The reverse shift lever 158 is placed to cause the propellers 154 to rotate through the gear boxes 155, the rotors 156 in a direction opposite to that of the air stream. The air passing the rotors 156 is now deflected upwards and develops an upward thrust which forces the dirigible 152 downward, thus causing descent of the dirigible without the necessity of valving gas.

The ordinary water craft, such as sailing vessels, motor yachts and ocean liners, due to their water displacement, offer so much hull resistance to the water that high forward speeds can not be obtained. In the arrangement shown by Figs. 30 and 31 and 35, there is illustrated a method of obtaining greater speeds from such vessels. The ocean liner 159 has mounted on the sides thereof the rotors 160. These rotors are mounted below the water level and are adapted to cooperate with the water stream. Eccentrically arranged with reference to the rotors 160 are the paddle wheels 180. The electric motors 161 serve to propel the rotors 160 and their associated paddle wheels 180. With the rotor revolving in the direction of the water stream, due to the Magnus effect of the rotors, a substantially vertical lift is obtained which raises the liner 159 so that less of its hull is exposed to the water resistance. Due to the eccentric mounting of the paddle wheels 180 with respect to the rotors 160, the blades of the paddle wheels are effective only in the position above the rotors. In this way the paddle wheels 180 on revolving give a thrust to the water in the direction of the water stream, substantially above the rotors, but below do not give a thrust against the water stream since there they are ineffective. Fig. 35 shows the details of the rotor and paddle wheel mounting. The rotor 160 revolves around the fixed shaft 210. The blades 211 of the paddle wheel 212 protrude through the slots 213 of the rotor 160. The paddle wheel 212 revolves around the bushing 214 which is eccentrically mounted on the shaft 210. The paddle wheel 212 revolves with the rotor 160 and due to its eccentric mounting its blades extend out of the top of the rotor but not out of the bottom.

In Figs. 32 and 33 there is illustrated the use of rotors with a submarine. The submarine 162 has the rotors 163 and 164 mounted on both sides thereof. The rotor 164 is rotated by means of the electric motors 165, which may be reversed at will. The rotors 163 are revolved by similar electric motors (not shown). When it is desired that the submarine 162 ascend at a steep angle, the rotors 164 are caused to revolve at high speed in a direction parallel to that of the water stream and the rotors 163 are caused to revolve at a high speed in a direction opposite to the water stream. The rotors 164 give a lifting thrust and the rotors 163 give a downward thrust, the cumulative effect being to lift the bow and depress the stern of the submarine 162.

Likewise, causing the rotors 164 to revolve in a direction opposite to that of the water stream with the rotors 163 revolving in the direction of the water stream, the bow is depressed and the stern elevated, resulting in the rapid descent of the submarine 162. By revolving the rotors 163 and the rotors 164 in the direction of the water stream the submarine is lifted upwards. By revolving the rotors 163 and 164 in the opposite direction to that of the water stream the submarine is caused to descend in a substantially horizontal position.

The submarine 162 is also shown with a rotor control surface behind its propeller. This control surface is effective as a rudder to turn the submarine. The rotor control surface 220 is stream lined in shape and is so supported by the frame 221 that it may be rotated around its longitudinal axis by the electric motor 222 which is enclosed within the rotor surface. The front end of the rotor 220 has attached thereto the control shaft 223 which is responsive to control mechanism within the submarine for elevating or depressing the front end of the rotor 220. With the submarine in motion and the rotor control surface revolving in a clockwise direction, if the front end of the rotor is depressed, a thrust at right angles to the water stream and to the plane of the drawing is obtained, the direction of the thrust being out of the plane of the drawing the resulting action being to turn the submarine to the left. Conversely, if the front end of the rotor is elevated a thrust into the plane of the drawing is obtained and the submarine is turned to the right. The rotor control surface 220 may also be adapted to have its front portion moved to the left or right of the propeller of the vessel in which case the thrust will be to raise or lower the bow of the submarine.

While the rotors in the foregoing description have, for the purpose of illustration, been shown as cylindrical, it should be understood that any form of moving surface utilizing the Magnus effect may be employed.

For maximum efficiency it is believed that the rotors should be rotated at a surface speed from three to four times that of the fluid in which they are placed. Also, for best results, end plates having a diameter greater than that of the rotor should be placed on each rotor to prevent end circulation of the fluid.

What is claimed it:

1. In an aircraft, means for producing an accelerated air stream, a rotor airfoil supported within said accelerated air stream, and means for driving the surface of said airfoil from said accelerated air stream at a speed of from three to four times that of said accelerated air stream.

2. In an aircraft, means for producing an air stream, a rotor airfoil supported and located within said air stream, and means within said rotor for revolving same from said air stream.

3. In an aircraft, means for producing an air stream, a rotor airfoil supported in said air stream, means for deflecting a portion of said air stream in one end of said airfoil, means for deflecting said portion out the other end of said airfoil, and means operated by said portion for revolving said airfoil.

4. In an aircraft, means for producing an air stream, a rotor airfoil supported in said air stream, and an air screw within said airfoil for revolving said airfoil from said air stream.

5. In an aircraft, means for producing an air stream, a rotor airfoil supported in said air stream, and means within said airfoil for revolving said airfoil at a surface speed higher than that of said air stream.

6. In an aircraft, means for producing an air stream, a rotor airfoil supported in said air stream, and an air screw within said airfoil for revolving same at a surface speed several times that of said air stream.

7. In a vessel supported in a fluid, means for producing a fluid stream past said vessel, a rotor control surface supported in said stream, means for revolving said control surface, and means for changing the angle of said control surface to said stream for deflecting said vessel.

8. In a vessel supported in a fluid, means for producing a movement of said fluid past said vessel, a rotor control surface normally arranged parallel to the movement of said fluid, means for revolving said surface, and means for placing said surface at an angle to said fluid movement to deflect said vessel.

9. In a vessel supported in a fluid, means for producing a movement of said fluid past said vessel, normally inoperative rotor control surfaces supported in said fluid movement, means actuated by said fluid for revolving said surfaces, and means for rendering said control surfaces operative to deflect said vessel.

10. In an aircraft, means for producing an air stream, a rotor control surface supported in said air stream, means for revolving said surface, and means for changing the angle said surface makes with said air stream for deflecting said aircraft.

11. In an aircraft, means for producing an air stream, a rotor control surface parallel to said air stream, means for revolving said surface, and means for placing said surface at an angle to said air stream to deflect said aircraft.

12. In an aircraft, means for producing an air stream, an adjustable rotor control surface so supported in said air stream as to be normally inoperative, and means for rendering said surface operative to deflect said aircraft.

13. In an aircraft, means for producing an air stream, a rotor control surface supported in said air stream, means for revolving said surface, and means for adjusting said surface for changing the angle of attack of said aircraft.

14. In an aircraft, means for producing an air stream, a rotor control surface supported in said air stream, means actuated by said air streams for revolving said surface, and means for adjusting said surface for turning said aircraft.

15. In an aircraft, means for producing an air stream, a rotor control surface supported in said air stream, means for revolving said surface, means for adjusting said surface for changing the angle of attack of said aircraft, and means for simultaneously adjusting said surface for turning said aircraft.

16. An aircraft comprising a body portion, an enclosure within said body portion, means for producing an air stream through said enclosure, a rotor airfoil supported in said air stream, and means for deflecting the air stream past said rotor substantially vertically downwards.

17. In an aircraft, a fixed airfoil, and a rotor airfoil, said rotor airfoil being spaced above and back of the center of said fixed airfoil and adjacent to the trailing edge of said fixed airfoil.

18. In an aircraft, a fixed airfoil, a rotor airfoil, said rotor airfoil being spaced above and near the trailing edge of said fixed airfoil, and a second rotor airfoil, said second airfoil being spaced below and near the trailing edge of said fixed airfoil.

19. In an aircraft, means for producing an air stream, a plurality of rotor airfoils, means for varying the amount of airfoil surface exposed to said air stream, and means for automatically maintaining the balance of said aircraft.

20. In an aircraft, means for producing an air stream, a plurality of rotor airfoils supported in said air stream, means for varying the effective amount of the rotor airfoil surfaces exposed to said air stream, and means operated by said first-mentioned means for automatically varying a control surface of said aircraft to maintain the balance thereof.

21. In an aircraft, means for producing an air stream, a plurality of rotor airfoils supported in said air stream, means for varying the effective amount of rotor airfoil surfaces exposed to said air stream, and means operated by said first-mentioned means for automatically adjusting a horizontal stabilizer of said aircraft to maintain the balance thereof.

22. In an aircraft, means for producing an air stream, a fixed airfoil and a rotor airfoil exposed to said air stream, means for withdrawing said rotor airfoil into said fixed airfoil, and means cooperating with said withdrawing means for automatically adjusting a control surface of said aircraft for maintaining the balance thereof.

23. An aircraft comprising a fixed airfoil, a rotor airfoil spaced therefrom, means for varying the position of said rotor airfoil relative to said fixed airfoil, and means simultaneously cooperating with said withdrawing means for automatically adjusting a control surface of said aircraft to maintain the balance thereof.

24. An aircraft comprising a fixed airfoil, a rotor airfoil spaced therefrom, means for varying the distance between said fixed airfoil and said rotor airfoil, and means cooperating with said first mentioned means for automatically adjusting a control surface of said aircraft for maintaining the balance thereof.

25. In an aircraft, means for producing an air stream, an airfoil in said air stream operative to produce a Magnus effect as a lifting force, and means for deflecting the air flow past said airfoil substantially vertically downwards.

26. In an aircraft, means for producing an air stream, a plurality of rotor airfoils in said air stream, and means for deflecting the air stream past said airfoils substantially vertically downwards.

27. An aircraft comprising means for producing an air stream, a rotor airfoil supported in said air stream, means for producing an air stream opposing said first air stream, and a rotor airfoil supported in said second air stream.

28. An aircraft comprising means for producing an air stream, a rotor airfoil supported therein, means for producing an air stream opposing said first air stream, a rotor airfoil supported in said second air stream, and means for deflecting the air streams passing said rotor airfoils substantially vertically downwards.

29. A heliocopter comprising means for producing opposing air streams, and rotor airfoils positioned in said air streams.

30. A vessel supported in a fluid comprising means for producing a fluid flow, a rotor adapted to produce Magnus effect supported in said fluid, air driven means for rotating said rotor in the direction of said fluid flow for raising said vessel, and means associated with said air driven means for reversing the direction of rotation of said rotor for causing the descent of said vessel.

31. An aircraft comprising means for producing an air stream, a rotor airfoil adapted to produce a Magnus effect supported therein, air driven means for revolving said airfoil in the direction of said air stream for raising said aircraft, and gearing interposed between said air driven means and said rotor airfoil for reversing the direction of rotation of said airfoil for causing the descent of said aircraft.

32. In an aircraft, means for producing an air stream, means adapted to produce Magnus effect for producing a downward displacement of said air stream for lifting said aircraft including air driven means, and means including said first mentioned means for producing an upward displacement of said stream for causing the descent of said aircraft.

33. In a dirigible aircraft, means for producing an air stream, and a rotor airfoil adapted to produce a Magnus effect supported therein and air driven means for rotating said rotor in the opposite direction into the flow of the air stream for causing the descent of said aircraft.

34. In a vessel supported in a fluid, means for producing a flow of said fluid, a rotor supported end of said vessel in said fluid flow adjacent the trailing edge, means for revolving said rotor at a higher speed than the speed flow of said fluid in the opposite direction to that of said fluid flow to lower the end of said vessel to which said rotor is supported.

35. In a vessel supported in a fluid, a rotor attached to said vessel, means to drive said rotor and fluid propelling means attached to said rotor.

36. In a vessel supported in a fluid, a rotor attached to said vessel, fluid propelling means attached to said rotor, and means for driving said rotor to move said vessel forwards and upwards.

37. In a vessel supported in a fluid, means for producing a fluid flow past said vessel, rotors supported in said fluid flow having fluid propelling means, and means for withdrawing said rotors and propelling means from said fluid flow.

38. A submarine comprising means for producing a fluid flow, rotors operative to produce a Magnus effect supported near the ends of said submarine, said rotors having fluid propelling means and means for rotating said rotors in the direction of said flow for lifting said submarine.

39. A submarine comprising means for producing a fluid flow, rotors operative to produce a Magnus effect supported near the ends of said submarine, said rotors having fluid propelling means and means for rotating said rotors in the opposite direction to that of said fluid flow for lowering said submarine.

40. A submarine comprising means for producing a fluid flow, rotors operative to produce a Magnus effect supported in said fluid flow near the ends of said submarine, and means for rotating said rotors in opposite directions to depress one end and raise the other end of said submarine, each rotor having fluid propelling means.

EDWARD F. ZAPARKA.